(12) United States Patent
Barlow

(10) Patent No.: US 8,501,305 B2
(45) Date of Patent: Aug. 6, 2013

(54) LAMINATE

(75) Inventor: David Barlow, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/523,496

(22) PCT Filed: Jan. 16, 2008

(86) PCT No.: PCT/GB2008/000135
§ 371 (c)(1),
(2), (4) Date: Nov. 23, 2009

(87) PCT Pub. No.: WO2008/087400
PCT Pub. Date: Jul. 24, 2008

(65) Prior Publication Data
US 2010/0068477 A1 Mar. 18, 2010

(30) Foreign Application Priority Data
Jan. 16, 2007 (GB) .................................. 0700824.6

(51) Int. Cl.
*B32B 9/00* (2006.01)
*H05B 7/06* (2006.01)

(52) U.S. Cl.
USPC ........ 428/200; 428/201; 428/209; 428/320.2; 428/339; 264/35; 264/467; 264/614

(58) Field of Classification Search
USPC . 428/209, 901, 200, 201, 320.2, 339; 264/35, 264/467, 614
See application file for complete search history.

(56) References Cited

U.S. PATENT DOCUMENTS

| | | | |
|---|---|---|---|
| 4,049,147 A | 9/1977 | Stiles et al. |
| 4,065,263 A | 12/1977 | Woodbridge, III |
| 4,247,591 A | 1/1981 | Gould |
| 4,472,471 A | 9/1984 | Klein et al. |
| 5,284,570 A | 2/1994 | Savage et al. |
| 5,288,463 A | 2/1994 | Chemelli |
| 5,500,071 A | 3/1996 | Kaltenbach et al. |
| 5,525,405 A | 6/1996 | Coverdell |

(Continued)

FOREIGN PATENT DOCUMENTS
EP 0 976 453 2/2000
EP 1 388 369 2/2004

(Continued)

OTHER PUBLICATIONS

Bi, et al "Deposition of PEG onto PMMA microchannel surface to minimize nonspecific adsorption," *Lab on a Chip*, vol. 6, 2006, pp. 769-775.

(Continued)

*Primary Examiner* — Cathy Lam
(74) *Attorney, Agent, or Firm* — Milstein Zhang & Wu LLC

(57) ABSTRACT

The present invention relates to laminate comprising a first thermoplastic polymer layer with a first melt flow index, adjacent a thermoplastic polymer second layer with a second melt flow index, the first and second layer comprising the same thermoplastic polymer, characterized in that the first melt flow index is lower than the second melt flow index. The invention also relates to a microfluidic device comprising the laminate and a method for incorporating an ink pattern in the laminate.

12 Claims, 2 Drawing Sheets

U.S. PATENT DOCUMENTS

| | | |
|---|---|---|
| 5,658,647 A | 8/1997 | Magill et al. |
| 5,665,469 A | 9/1997 | Brandt et al. |
| 5,882,571 A | 3/1999 | Kaltenbach et al. |
| 5,932,799 A | 8/1999 | Moles |
| 6,054,100 A | 4/2000 | StanchField |
| 6,103,199 A | 8/2000 | Bjornson et al. |
| 6,123,798 A | 9/2000 | Gandhi et al. |
| 6,284,113 B1 | 9/2001 | Bjornson et al. |
| 6,408,878 B2 * | 6/2002 | Unger et al. ............ 137/597 |
| 6,627,159 B1 | 9/2003 | Bedingham et al. |
| 6,632,653 B1 | 10/2003 | Astle |
| 6,787,111 B2 * | 9/2004 | Roach et al. ............ 422/509 |
| 6,803,019 B1 | 10/2004 | Bjornson et al. |
| 6,843,262 B2 | 1/2005 | Ismagilov |
| 6,863,878 B2 | 3/2005 | Klepper |
| 6,960,467 B2 | 11/2005 | Shieh et al. |
| 6,991,713 B2 * | 1/2006 | Adourian et al. ............ 204/453 |
| 7,155,344 B1 | 12/2006 | Parce et al. |
| 7,431,888 B2 * | 10/2008 | Frechet et al. ............ 422/506 |
| 2001/0055812 A1 | 12/2001 | Mian et al. |
| 2003/0017467 A1 | 1/2003 | Hooper et al. |
| 2005/0089449 A1 | 4/2005 | Polwart et al. |
| 2009/0022628 A1 | 1/2009 | Polwart et al. |

FOREIGN PATENT DOCUMENTS

| | | |
|---|---|---|
| WO | WO 94/26414 | 11/1994 |
| WO | WO 97/47967 | 12/1997 |
| WO | WO 99/03584 | 1/1999 |
| WO | WO 99/19717 | 4/1999 |
| WO | WO 99/43432 | 9/1999 |
| WO | WO 99/65664 | 12/1999 |
| WO | WO 01/07892 | 2/2001 |
| WO | WO 01/26812 | 4/2001 |
| WO | WO 01/30490 | 5/2001 |
| WO | WO 01/54814 | 8/2001 |
| WO | WO 02/081934 | 10/2002 |
| WO | WO 03/045557 | 6/2003 |
| WO | WO 03/046542 | 6/2003 |
| WO | WO 2004/071660 | 8/2004 |
| WO | WO 2004/080597 | 9/2004 |
| WO | WO 2006/085071 | 8/2006 |
| WO | WO 2008/087405 | 7/2008 |

OTHER PUBLICATIONS

Byung-Ho, et al., "Fabrication of three-dimensional microfluidic systems by stacking molded polydimeethylsiloxane(PDMS) layers" *Proceedings of the SPIE*, SPIE, Bellingham, VA, U.S., vol. 3877, pp. 222-229, Sep. 1999.

Khoo, et al., "Micro magnetic silicone elastomer membrane actuator" *Sensors and Actuators*, Elsevier Sequoia SA, Lausanne., vol. 89, 2001, pp. 259-266.

Manz, et al "Miniaturized Total Chemical Analysis Systems: a Novel Concept for Chemical Sensing," *Sensors and Actuators*, vol. B1, 1990, pp. 244-248.

* cited by examiner

LAMINATE

RELATED APPLICATIONS

This application is a National Phase application of International Application PCT/GB2008/000135, filed Jan. 16, 2008, which claims the benefit of GB Application No. 0700824.6, filed Jan. 16, 2007, each of which are herein incorporated by reference in their entirety.

The invention relates to a laminate particularly suitable for the printing of an ink pattern, such as a conductive ink electrode in a microfluidic device, and a method for printing such an ink pattern.

The incorporation of heat seals in polymeric laminates is well-known and is traditionally carried out by incorporating a layer of polymer, which will be used as heat seal during subsequent manufacture, into a co-extruded laminate. Upon application of a suitable temperature, the layer of polymer will become tacky and form a seal whilst the other layers of the co-extruded laminate remain unaffected.

This method can also be used to bond two films together. Each film is provided with an outer heat seal polymer layer. The two outer layers of heat seal polymer are arranged to face each other and may be bonded together, upon application of the suitable temperature and pressure. This technology is commonly employed in the packaging industry, where flexible and rigid polymers are used, for example for packaging food, healthcare products and other products.

Where an ink design or print is to be incorporated in the laminate, the ink is not applied to the heat seal layer, but another layer of the co-extruded laminate, such as, for example, a layer which is not in contact with the heat seal layer or a layer which can subsequently be adhesive laminated to the heat seal layer. Indeed, as the heat seal polymer needs to melt and flow to some extent for the bonding to be successful, and any ink pattern applied on the heat seal layer would be distorted by this flow. The distortion caused by this flow is disadvantageous where the ink pattern has a decorative purpose, but even more so where the ink pattern serves a functional purpose, which is the case for example in microfluidic devices.

Microfluidic devices, used in many fields such as pharmaceuticals, biotechnology, the life sciences, defense, public health, and agriculture, are miniaturized systems controlling the flow of minute amounts of liquids or gases, to carry out lab-on-a-chip assays. These devices include a number of three-dimensional networks of channels and components, and thus require a high level of accuracy and precision during manufacture.

These microfluidic devices may comprise one or more semi-encapsulated electrodes, formed by application of ink between two heal seal layers. However, it has been shown that, in such devices, the ink distorts, spreads and cracks, when the heat seal polymer flows, thereby breaking the circuit of the electrodes. And where the heat seal polymer does not flow, it has been shown to be insufficient bonding between the heat seal layers. Several alternative heat seal materials were investigated, which led to the same issues.

It is an object of the invention to mitigate problems such as those described above.

According to a first aspect of the invention, there is provided a laminate comprising a first thermoplastic polymer layer with a first melt flow index, adjacent a thermoplastic polymer second layer with a second melt flow index, the first and second layer comprising the same thermoplastic polymer, characterised in that the first melt flow index is lower than the second melt flow index.

According to an embodiment of the invention, the first layer is bonded to the second layer. The thermoplastic polymer in the first and second layer is preferably polyethylene.

According to another embodiment of the invention, the first layer comprises ink, which preferably forms a pattern on the surface of the first layer adjacent the second layer.

According to a further embodiment of the invention, the ink is conductive and preferably forms an electrode.

According to a second aspect of the invention, there is provided a microfluidic device comprising a laminate as described above.

According to a third aspect of the invention, there is provided a method for incorporating an ink pattern in a laminate comprising the steps of
a. providing a first thermoplastic polymer layer with a first melt flow index;
b. applying the ink pattern onto a surface of the first layer;
c. bonding said surface with a second thermoplastic polymer second layer with a second melt flow index;
the first and second layer comprising the same thermoplastic polymer and wherein the first melt flow index is lower than the second melt flow index.

According to an embodiment of the invention, the surface of the first layer is bonded to the second layer by application of heat, preferably the sealing temperature. Pressure may also be applied for better adhesion of the heat seal layers.

According to a further embodiment of the invention, the ink applied onto a surface of the first layer is conductive and preferably forms an electrode.

The invention relates to a laminate comprising a first thermoplastic polymer layer with a first melt flow index, adjacent a thermoplastic polymer second layer with a second melt flow index, the first and second layer comprising the same thermoplastic polymer, characterised in that the first melt flow index is lower than the second melt flow index. The laminate comprises an efficient heat seal layer and is particularly suitable for incorporation of an ink pattern therein, without distortion, cracking or breaking of the ink pattern. The invention further relates to microfluidic devices comprising such a laminate and to a method of printing an ink pattern using such a laminate.

The invention will further be described by way of examples and with reference to the accompanying drawings, in which.

Figure 1:
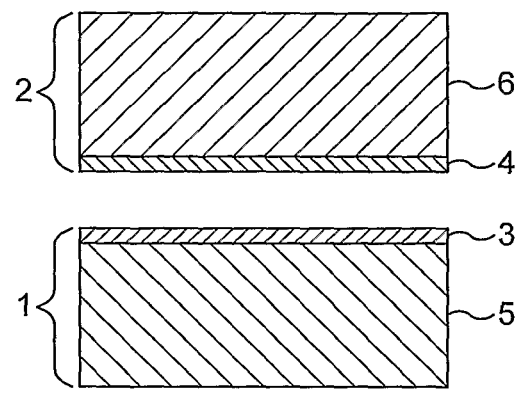
FIG. 1 is a schematic view of a laminate according to the invention.
Figure 2:
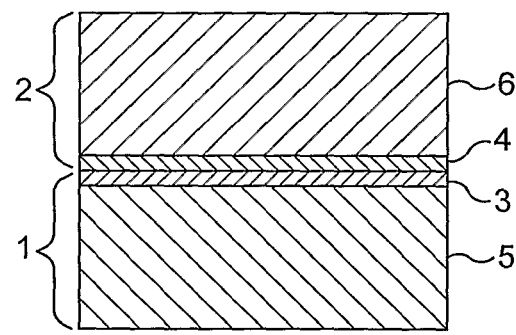
FIG. 2 is a schematic view of the laminate of FIG. 1, in which the first and the second thermoplastic layer are bonded together.

Referring to FIGS. 1 and 2 there is illustrated a laminate according to the invention. The laminate comprises a first and a second co-extruded film 1, 2, each comprising one or more co-extruded layers 5, 6. The first co-extruded film 1 further comprises a thermoplastic polymer or heat seal layer 3, with a first melt flow index and the second co-extruded film 2 further comprises a thermoplastic polymer or heat seal layer 4, with a second melt flow index. As illustrated by FIG. 2, the first and the second thermoplastic polymer layer 3, 4 may be bonded together by application of heat and preferably pressure.

It is essential for efficient bonding to be obtained that both heat seal layers 3, 4 comprise the same material. Most preferably, both heat seal layers 3, 4 consist essentially of the same thermoplastic polymer. The preferred thermoplastic polymer for the heat seal layers 3, 4 is polyethylene, however, other thermoplastic polymers, such as polyolefin and polypropylene may be used.

In order to reduce the flow of the thermoplastic material, polymers with lower melt flow index may be selected. However, sufficient seal cannot be achieved when one merely use a heat seal material of low melt flow index [PLEASE PROVIDE, IF AVAILABLE, THE LOWEST MELT FLOW INDEX WHICH CAN BE USED] and a second heat seal material of higher melt flow is necessary.

The Melt Flow Index (MFI) is a measure of the flow of the melt of a thermoplastic polymer and corresponds to the amount (in grams) of polymer which can be forced through an orifice of specific diameter in 10 minutes, when subjected to a specific pressure at a specific temperature. Thus, the lower the melt flow index, the less flow is obtained upon heating and the less flexible the material. Methods for measuring the melt flow index of a material are given, for example in ASTM D1238 and ISO R1133.

Figure 3:
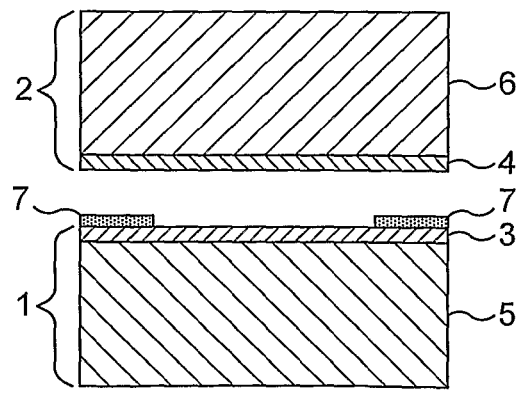
FIG. 3 is a schematic view of a second laminate according to the invention.
Figure 4:
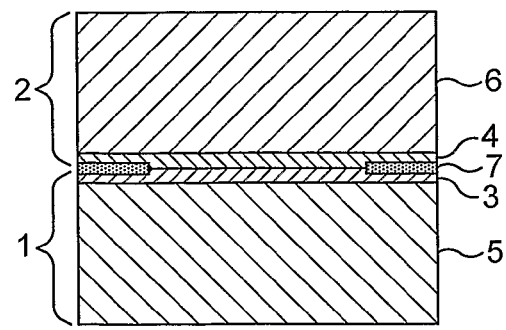
FIG. 4 is a schematic view of the laminate of FIG. 3, wherein the first thermoplastic polymer and the second thermoplastic polymer layer are bonded.

FIGS. 3 and 4 are schematic view of a further laminate according to the invention, in which the first co-extruded film 1 comprises one or more co-extruded layers 5, a heat seal layer 3 and an ink pattern 7, applied onto the surface of the heat seal layer 3, which may bond to heat seal layer 4 of film 2. Upon application of heat, thermoplastic polymer layer 4, with the higher melt flow index, contributes to the flow required for the heat seal layers 3, 4 to bond, while thermoplastic polymer layer 3, with the lower melt flow index, has enough tackiness to accept the adhesion, but not enough to cause ink distortion. Thus, an acceptable bond strength is obtained, without distortion of the ink pattern.

Figure 5:
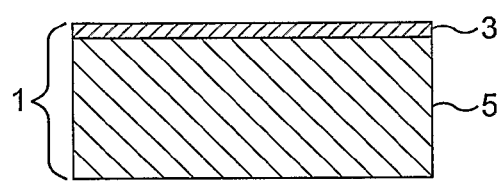
FIG. 5 is a schematic view of a co-extruded film comprising the first thermoplastic polymer layer.
Figure 6:
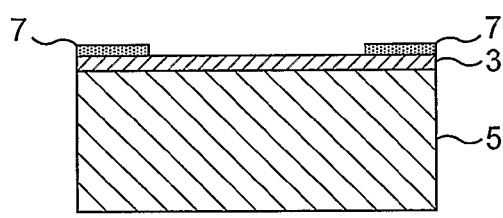
FIG. 6 is a schematic view of the co-extruded film of FIG. 5, further comprising an ink pattern.

The laminate as shown on FIG. 3 may be obtained by providing a first film 1 comprising a thermoplastic polymeric layer 3 and one or more other layers 5, which may be co-extruded to form a co-extruded film 1 illustrated by FIG. 5. FIG. 6 shows a schematic view of a co-extruded film 1, in which an ink pattern 7 has been applied onto the outer surface of the heat seal layer 3. The ink pattern 7 may form a specific decorative design. Alternatively, the ink may be a conductive ink, applied onto the heat seal surface to form an electrode circuit.

Figure 7:
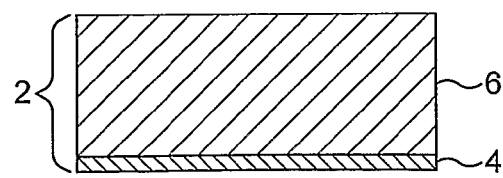
FIG. 7 is a schematic view of a co-extruded film comprising the second thermoplastic polymer layer.

FIG. 7 shows a second film 2 comprising a thermoplastic polymeric layer 4 and one or more other layers 6, which may be co-extruded to form a co-extruded film 2. The heat seal layer 4 comprises, or preferably consists essentially of, the same polymer as heat seal layer 3 and the melt flow index of heat seal layer 3 is lower than that of heat seal layer 4.

Finally, the heat seal layers 3 and 4 of the first and the second co-extruded films 1, 2 are placed against each other, and upon application of heat, the polymer of heat seal layer 3 starts flowing and heat seal layer 4 achieves sufficient tackiness to accept the adhesion to heat seal layer 3. The temperature to be applied, or sealing temperature, for a given material is known in the art and is specific to a given material, regardless of its melt flow index. As heat seal layer 4 has a lower melt flow index, the ink pattern does not distort, crack or break.

The invention claimed is:

1. A laminate comprising a first thermoplastic polymer layer with a first melt flow index, adjacent a second thermoplastic polymer layer with a second melt flow index, the first and second thermoplastic polymer layers comprising the same type of thermoplastic polymer having different melt flow index, wherein the first melt flow index at a given temperature and pressure is lower than the second melt flow index at the same temperature and pressure, wherein a surface of the first thermoplastic polymer layer is heat-bonded to a surface of the second thermoplastic polymer layer, and wherein the first thermoplastic polymer layer comprises an ink pattern on the surface heat bonded to the second thermoplastic polymer layer.

2. The laminate according to claim 1, wherein the thermoplastic polymer is polyethylene.

3. The laminate according to claim 2, wherein the ink pattern forms an electrode circuit on the surface of the first thermoplastic polymer layer adjacent the second thermoplastic polymer layer.

4. The laminate according to claim 1, wherein the thermoplastic polymer is polypropylene.

5. The laminate according to claim 4, wherein the ink pattern forms an electrode circuit on the surface of the first thermoplastic polymer layer adjacent the second thermoplastic polymer layer.

6. A microfluidic device comprising a laminate according to claim 1.

7. A method for incorporating an ink pattern in a laminate comprising:
 providing a first thermoplastic polymer layer with a first melt flow index;
 applying the ink pattern onto a surface of the first thermoplastic polymer layer,
 bonding said surface with a second thermoplastic polymer layer with a second melt flow index;
 the first and second thermoplastic polymer layers comprising the same type of thermoplastic polymer having different melt flow index, wherein the first melt flow index is lower than the second melt flow index,
wherein the ink pattern does not distort, crack or break after the bonding step.

8. The method according to claim 7, wherein the surface of the first thermoplastic polymer layer is bonded to the second thermoplastic polymer layer by application of heat.

9. The method according to claim 8, wherein the heat applied is a sealing temperature of the thermoplastic polymer.

10. The method according to claim 7, wherein the bonding step is carried out under pressure.

11. The method according to claim 7, wherein the ink is conductive.

12. The method according to claim 11, wherein the ink pattern forms an electrode.

* * * * *